United States Patent
Hsiao et al.

(10) Patent No.: US 7,035,047 B2
(45) Date of Patent: Apr. 25, 2006

(54) MAGNETIC RECORDING HEADS HAVING THIN THERMALLY CONDUCTIVE UNDERCOATING

(75) Inventors: Wen-Chien Hsiao, San Jose, CA (US); Peter Beverley Powell Phipps, Saratoga, CA (US); Yong Shen, Saratoga, CA (US); John Jaekoyun Yang, Pinole, CA (US); Samuel Wei-san Yuan, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 10/271,293

(22) Filed: Oct. 15, 2002

(65) Prior Publication Data

US 2004/0070870 A1    Apr. 15, 2004

(51) Int. Cl.
*G11B 5/147* (2006.01)

(52) U.S. Cl. ...................................... 360/126

(58) Field of Classification Search ............... 360/126, 360/317, 318, 120, 320, 324.2, 123; 29/603.14; 428/692; 438/3; 361/760; 483/3; 136/325; 51/309

See application file for complete search history.

(56) References Cited

U.S. PATENT DOCUMENTS

| | | | | |
|---|---|---|---|---|
| 4,304,576 A * | 12/1981 | Hattori et al. | ................. | 51/309 |
| 5,357,389 A * | 10/1994 | Blanchette et al. | ......... | 360/120 |
| 5,644,455 A * | 7/1997 | Schultz | ........................ | 360/320 |
| 5,995,342 A * | 11/1999 | Cohen et al. | ................ | 360/126 |
| 6,046,891 A | 4/2000 | Yoda et al. | .................. | 360/113 |
| 6,125,009 A * | 9/2000 | Ishiwata et al. | ............. | 360/317 |
| 6,172,858 B1 | 1/2001 | Yoda et al. | ................. | 360/313 |
| 6,188,544 B1 | 2/2001 | Mino | .......................... | 360/126 |
| 6,307,720 B1 | 10/2001 | Hayakawa | ................... | 360/313 |
| 6,339,187 B1 * | 1/2002 | Inoue | ......................... | 136/225 |
| 6,477,765 B1 * | 11/2002 | Herrera | .................... | 29/603.14 |
| 6,522,555 B1 * | 2/2003 | Hirano et al. | ............... | 361/760 |
| 6,661,605 B1 * | 12/2003 | Pust et al. | ................... | 360/126 |
| 6,692,847 B1 * | 2/2004 | Shirasaki et al. | ........... | 428/692 |
| 6,737,281 B1 * | 5/2004 | Dang et al. | .................... | 438/3 |
| 6,738,232 B1 * | 5/2004 | Sasaki | ........................ | 360/317 |
| 6,760,190 B1 * | 7/2004 | Kato et al. | ................... | 360/126 |
| 6,842,317 B1 * | 1/2005 | Sugita et al. | ............ | 360/324.2 |
| 2001/0000446 A1 | 4/2001 | Mino | .......................... | 360/317 |
| 2002/0097531 A1 * | 7/2002 | Inoue et al. | ................ | 360/317 |

OTHER PUBLICATIONS

Junior et al, Ceramic 50 (2004)247-253; Thermal conductivity of polystalline aluminum nitride (AlN) ceramic.*

* cited by examiner

Primary Examiner—Tianjie Chen
(74) Attorney, Agent, or Firm—Zilka-Kotab, PC (57) ABSTRACT

A magnetic head having read and write elements is provided according to one embodiment. The head includes a substrate. An undercoating is coupled to the substrate. The undercoating has a preferred thickness of between about 1.5 and 0.5 microns or less in a direction perpendicular to the planar surface of the substrate engaging the undercoating. Preferably, the undercoating is reduced to a desired thickness during fabrication using chemical mechanical polishing. The undercoating is constructed of a material having a thermal conductivity greater than that of amorphous $Al_2O_3$. An electric contact pad is operatively coupled to a layer positioned between the pad and the undercoating. Electric contact pads of read and write elements are preferably separated from the undercoating by insulation planarization layers. A write element is coupled to the undercoating. The write element has an electrically conductive coil. The new thinner and more thermally conductive undercoating allows more heat to transfer through it from the write element to the substrate.

14 Claims, 5 Drawing Sheets

MAGNETIC RECORDING HEADS HAVING THIN THERMALLY CONDUCTIVE UNDERCOATING

FIELD OF THE INVENTION

The present invention relates to magnetic recording heads, and more particularly, this invention relates to an improved structural design for magnetic recording heads.

BACKGROUND OF THE INVENTION

In a disk drive, a magnetic recording head is made of read and write elements. The write element is used to record and erase data bits arranged in circular tracks on the disk while the read element plays back a recorded magnetic signal. The magnetic recording head is mounted on a slider which is connected to a suspension arm, the suspension arm urging the slider toward a magnetic storage disk. When the disk is rotated the slider flies above the surface of the disk on a cushion of air which is generated by the rotating disk.

The read element is generally made of a small stripe of multilayer magnetic thin films which have either magnetoresistance (MR) effect or giant magnetoresistance (GMR) effect, namely which changes resistance in response to a magnetic field change such as magnetic flux incursions (bits) from magnetic storage disk. Recorded data can be read from a magnetic medium because the external magnetic field from the recorded medium (the signal field) causes a change in the direction of magnetization in the read element, which in turn causes a change in resistance in the read element and a corresponding change in the sensed current or voltage.

Figure 1:
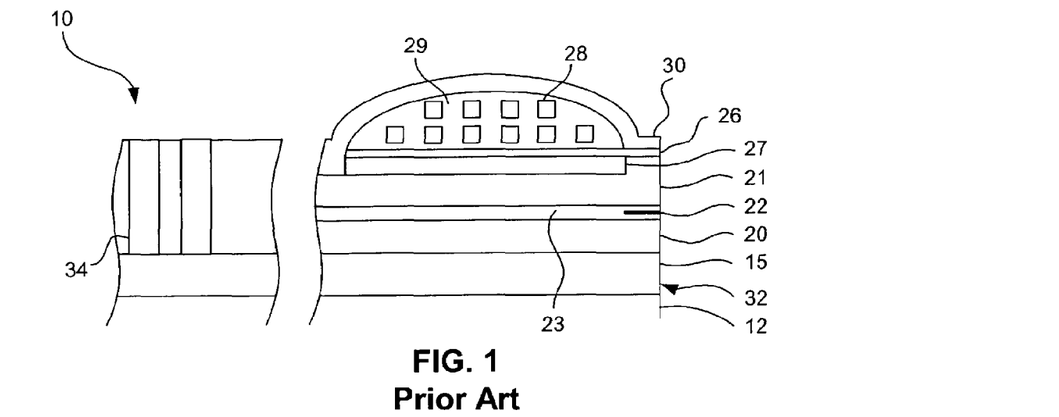
FIG. 1 is a cross-sectional view of a conventional composite type magnetic head, perpendicular to the plane of the ABS.
Figure 2A:
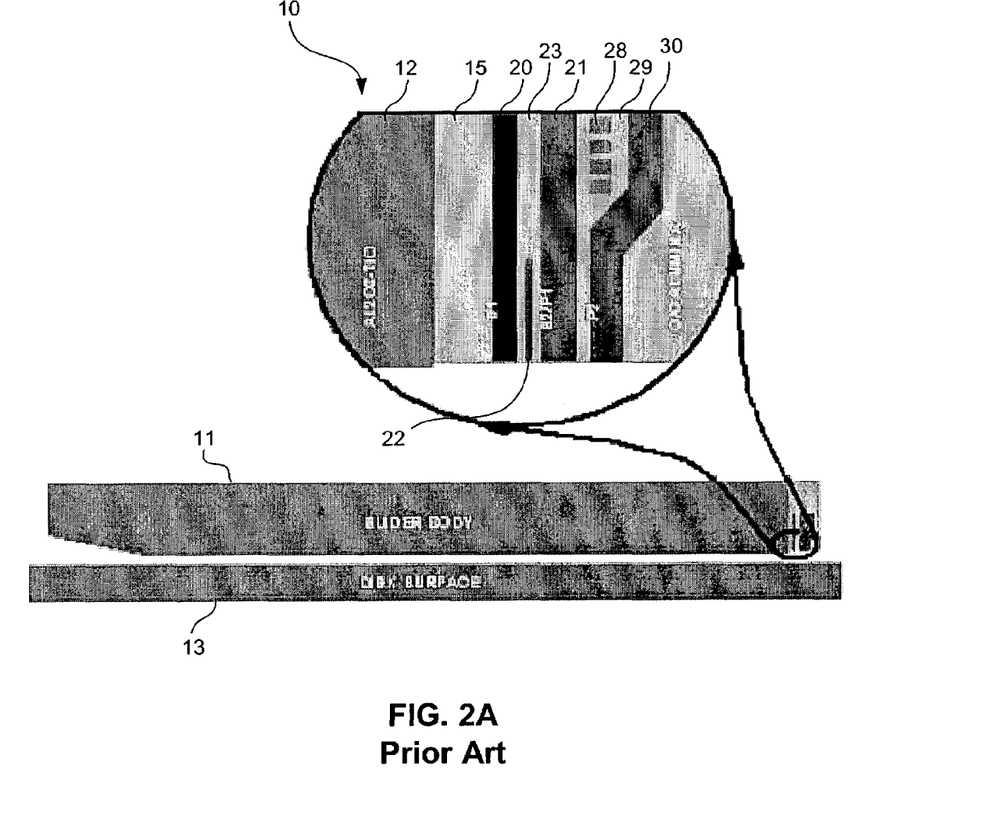
FIG. 2A shows the ideal slider flying above the disk.

FIGS. 1 and 2A–2C illustrate examples of a conventional composite type thin-film magnetic head 10. FIG. 1 is a cross-sectional view of the head 10 perpendicular to the plane of the ABS. FIG. 2A shows the slider 11 flying above the disk 13.

In these figures, the reference numeral 12 denotes a substrate, 15 denotes an undercoating, 20 denotes a lower shield layer of the MR reproducing head part, 21 denotes an upper shield layer of the MR head part, which also acts as a lower pole of an inductive recording head part, 22 denotes a MR layer provided through an insulating layer 23 between the lower shield layer 20 and the upper shield layer 21, 26 denotes a recording gap layer, 27 denotes a lower insulating layer deposited on the upper shield layer 21, 28 denotes a coil conductor formed on the lower insulating layer 27, 29 denotes an upper insulating layer deposited so as to cover the coil conductor 28, 30 denotes an upper pole, and 34 denotes a pad positioned directly on the undercoating 15. Note that the pad 34 connects directly to the coil conductor 28. The upper pole 30 is magnetically connected with the lower pole (upper shield layer) 21 at its rear portion so as to constitute a magnetic yoke together with the lower pole 21.

As recording density and data transfer rate are increased 100% and 50% respectively for the past a few years, critical dimensions in recording device such as track width read and write gap and coil size have decreased accordingly. Also, the flight height between the air bearing surface (ABS) 32 and the media have become smaller and smaller. For reference, recording heads with 40 gb/in2 products typically have fly heights of 6–12 nanometer. This reduction in head critical dimensions and fly height, while beneficial to magnetic performance, also comes with cost on thermal and mechanic reliability.

Figure 2B:
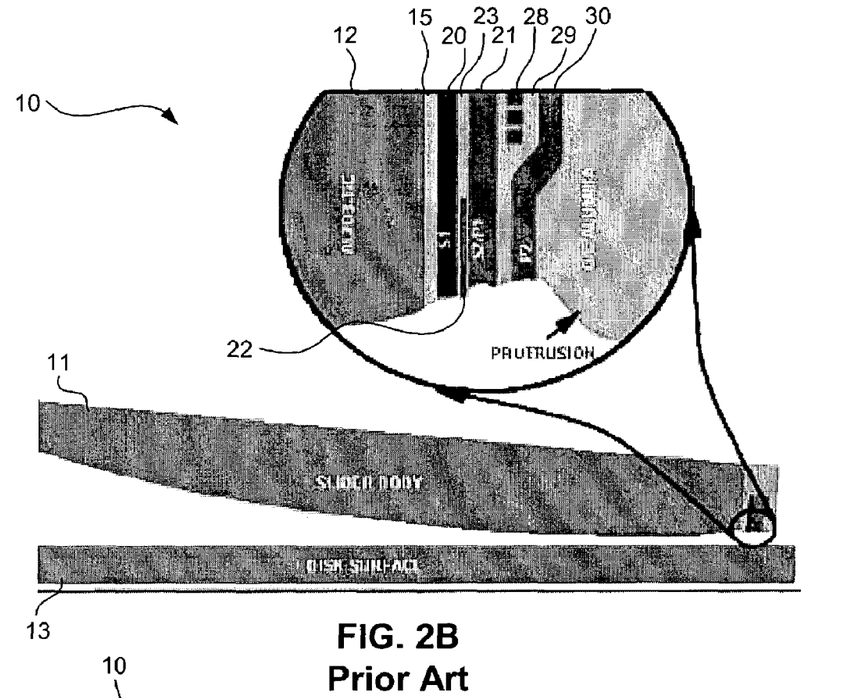
FIG. 2B depicts the actual head during operation of the write element with current passing through coil, and particularly illustrating protrusion of the layers.
Figure 2C:
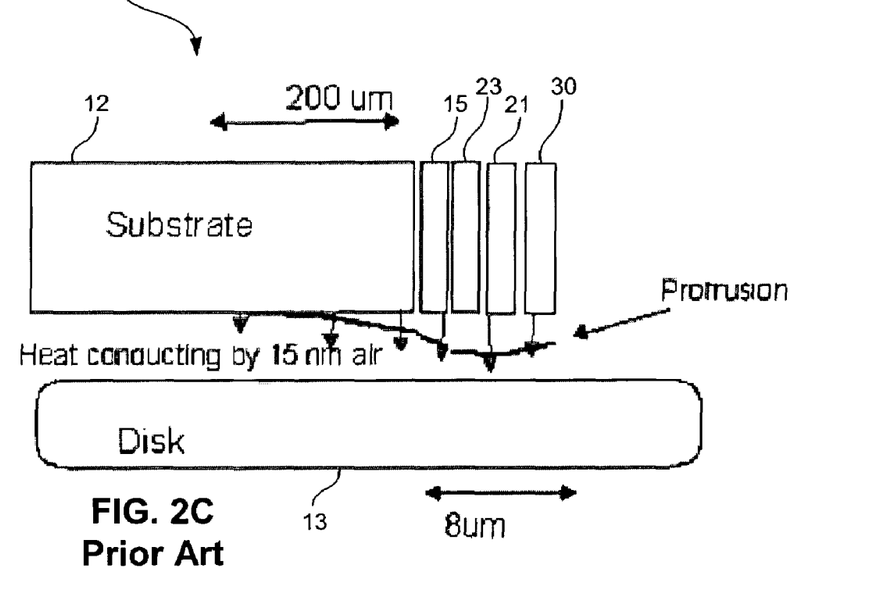
FIG. 2C is a detailed diagram of the heat transfer profile and protrusion profile of the head.

The thermal expansion coefficients for the substrate and the various layers of the head differ, so when the head becomes heated during use, some layers will begin to protrude from the ABS. FIG. 2B depicts the head 10 when the write element is operating with current passing through the coil, and particularly illustrating protrusion of the layers that occurs during use. FIG. 2C is a detailed diagram of the heat transfer and protrusion profile of the head 10. One particular problem appearing in the latest generation of heads is that the write-induced protrusion of the pole and overcoat can cause head-media contact, resulting in hard disk drive failure. In older generations of heads, this was not a problem because the head was flying much higher and device size was bigger leading to easier heat dissipation. However, the latest generation of heads fly 60–120 Å above the media and the flight height is projected to decrease further for future products. Further, the coil length in modern heads has decreased to accommodate high data rate advancement. Consequently, ohmic heating from write current through coil and eddy current in write pole/yoke and magnetic hysteresis of magnetic materials are confined in a tiny space near ABS, which leads to unacceptable thermal protrusion and drive reliability failures. As can be seen in FIG. 2B, the top write pole 30 and overcoat protrude from the ABS 32 toward the media 13. The protrusion amount can be as high as 5–7 nanometers.

The thermal expansion is proportional to the temperature, so it would be desirable to reduce the temperature in order to limit the thermal expansion. This in turn would reduce protrusion.

The undercoating 15 in standard heads is a poor thermal conductor, and therefore effectively blocks heat transfer from the write element to the substrate 10, which could otherwise act as a heat sink. Undercoating materials used in magnetic recording heads are typically made of sputtered amorphous $Al_2O_3$ with a thickness ranging from 2 to 5 microns. As amorphous $Al_2O_3$ is a very poor thermal conductor. The high thickness of the undercoating 15 has further compounded the problem of poor heat dissipation from write element to substrate. The current method for planarizing the undercoating 15 is mechanical lapping to a target thickness. Drawbacks of lapping are high defect rate and poor thickness uniformity control. Thus, the undercoat thickness can be made no thinner than 2 micron.

Figure 4:
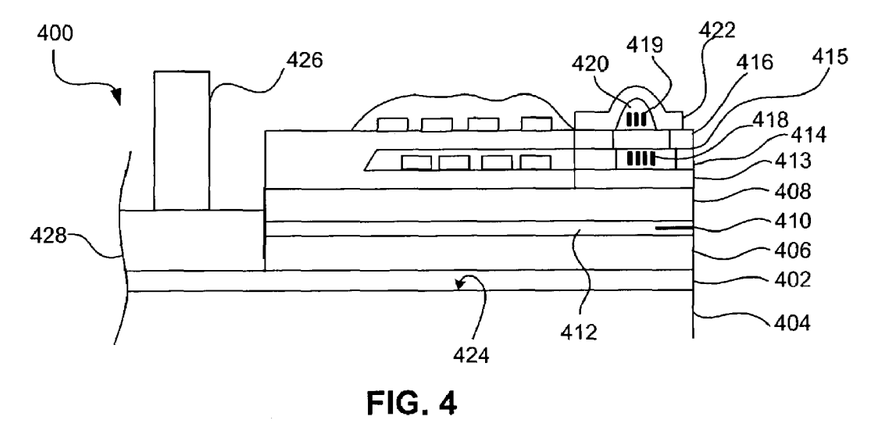
FIG. 4 is a cross sectional view of a magnetic head with improved thermal characteristics according to one embodiment.

The prior art did not recognized a solution to the problems appearing in the latest generation and future generation of heads, because, as mentioned above, protrusion did not present a significant problem in old system having higher fly height (150–500 A). In addition, the thick UC in earlier generations of recording heads was required due to the pad design in which the pad directly sits on the top of the UC surfaces. Noise from substrate would have been picked up if a thin UC had been used. It would be desirable to add, more planarization layers to recording heads (as shown in FIG. 4), such that the contact pads no longer sit directly on the top of UC.

A further problem is that the temperature rise reduces the life of the read sensor. The reader element is made of multilayer ultra thin layers and antiferromagnetic materials. High temperature causes interface mixing leading to low GMR coefficient and thus reduces the readback signal. In many hard disk drives, the read element remains in active mode during writing. A typical read element has a narrow stripe in the range 500–2000 Å and passes sensing current in the range of 2–6 mA. Such high current density will induce temperature rise in the read strip region to over 120–200 C in operating mode. Writing induced heat will further increase the read element temperature, resulting in either shortened life time of read element or will force the read element to work at a lower current, leading to a lower playback signal.

It would therefore be desirable to overcome the heretofore unaddressed problems appearing in the latest generation of heads, and sure to appear in future generations, one such problem being that thick undercoating materials coupled with the poor thermal conductivity of the industry standard amorphous $Al_2O_3$ render heating conduction from the writing element to the substrate body ineffective.

DISCLOSURE OF THE INVENTION

A magnetic head having read and write elements is provided according to one embodiment. The head includes a substrate. An undercoating is coupled to the substrate. The undercoating has a preferred thickness of less than about 1.5 microns, and ideally between 1.5 to 0.5 microns, in a direction perpendicular to the plane of the surface of the substrate engaging the undercoating. Preferably, the undercoating is reduced to a desired thickness during fabrication using chemical mechanical polishing (CMP). This produces a smooth and uniform undercoating of the desired thickness.

The undercoating is constructed of a material having a thermal conductivity greater than that of amorphous $Al_2O_3$. The undercoating can be constructed of, for example, crystalline $Al_2O_3$, AlN, AlNO, SIN, SiC, etc. Note that this list of materials is not exhaustive. The new thinner and more thermally conductive undercoating allows more heat to transfer through it from the write element to the substrate, thereby reducing the thermal protrusion of the writer element during writing. Further, the read element will be cooler as reader element is placed between write element and UC/substrate, resulting in longer read element life.

Preferably, the substrate and the undercoating are constructed of materials having thermal expansion coefficients within a predetermined range from each other. More particularly, the undercoating and substrate should have similar thermal expansion coefficients.

Electrical contact pads for the read element are operatively coupled to a planarization layer of the write element and positioned several layers above the undercoating rather than directly on the undercoating. For example, the electric contact pads of the read and write elements are preferably separated from the undercoating by one or more insulation planarization layers. The distance of the pad coupled with the insulation provided by the planarization layers provides for a clean playback signal with little noise picked up from the substrate.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior Art

Prior Art

Prior Art

Prior Art

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 3:
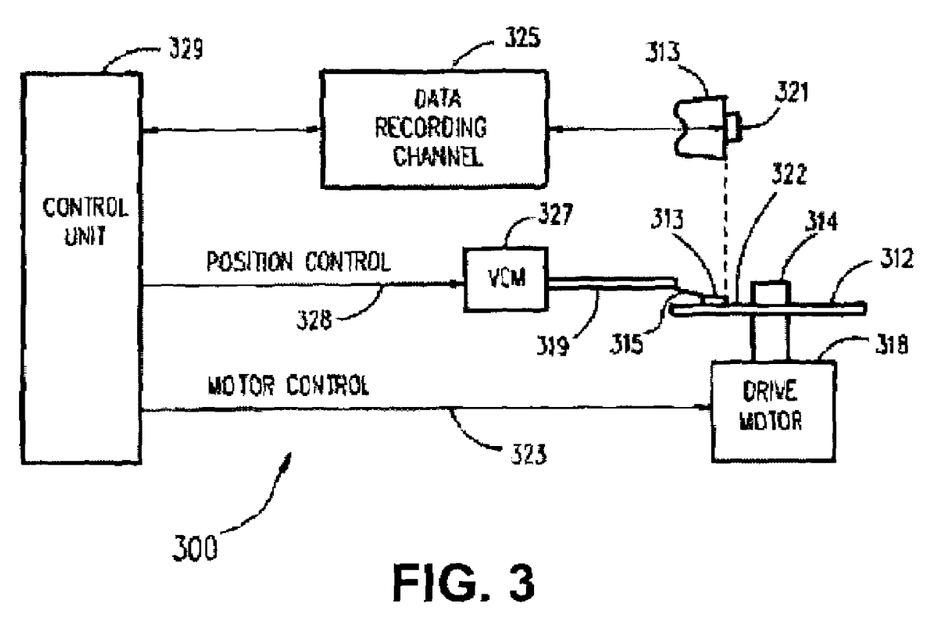
FIG. 3 is a perspective drawing of a magnetic disk drive system in accordance with one embodiment.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording on each disk is in the form of an annular pattern of concentric data tracks (not shown) on disk 312.

At least one slider 313 is positioned on the disk 312, each slider 313 supporting one or more magnetic read/write heads 321. More information regarding such heads 321 will be set forth hereinafter during reference to FIG. 4. As the disks rotate, slider 313 is moved radially in and out over disk surface 322 so that heads 321 may access different tracks of the disk where desired data are recorded. Each slider 313 is attached to an actuator arm 319 by means way of a suspension 315. The suspension 315 provides a slight spring force which biases slider 313 against the disk surface 322. Each actuator arm 319 is attached to an actuator means 327. The actuator means 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

FIG. 4 is a cross sectional view of a magnetic recording head 400 with improved thermal characteristics according to one embodiment. This is an integrated design, not a piggyback. One preferred design is a piggyback.

The novel structure of this new head greatly reduces the temperature in the read and write regions by using a revolutionary new undercoating 402 construction that 1) is of a heretofore unavailable thin dimension, and/or 2) is thermally optimized through use of thermally conductive materials. This new undercoating allows heat to transfer more readily therethrough to the substrate 404, which has much higher thermal conductivity and larger thermal mass and can therefore act as a heat sink from which heat can dissipate. The result is a head with limited pole protrusion which can therefore operate with a smaller air gap. The read element of the head also has a much improved lifespan, as thermal degradation is minimized.

In FIG. 4, the reference numeral 404 denotes a substrate, 402 denotes an undercoating, 406 denotes a lower shield layer of the MR/GMR reproducing head part (read element), 408 denotes an upper shield layer of the, 410 denotes a MR/GMR layer provided through an insulating layer 412 between the lower shield layer 406 and the upper shield layer 408, 413 denotes a bottom writer pole of the write element, 414 denotes a pedestal on the bottom writer pole, 416 denotes top write pole tip above a write gap 415, 418 denotes a first coil layer, 419 denotes a second coil, 420 denotes an upper insulating layer deposited so as to cover the second coil conductor 419, and 422 denotes an upper pole stitched to the top pole tip 416 near the ABS. The upper pole 422 is magnetically connected with the bottom pole (upper shield layer) 408 at its rear portion so as to constitute a magnetic yoke together with the lower pole 408.

The substrate in a preferred embodiment is an $Al_2O_3$-TiC composite conducting material. For $Al_2O_3$-TiC substrate, conventional materials such as amorphous $Al_2O_3$ can be used for an undercoat in some embodiments. However, preferred materials are crystalline $Al_2O_3$, AlN, and AlNO. Those materials have comparable thermal expansion coefficients, but substantially higher thermal conductivity coefficients than $Al_2O_3$.

Other substrate choices include Si-based materials. For Si based substrate, SiO2 can be used in some embodiments. However, preferred materials are SIN, SiC, or other materials with a higher thermal conductivity than $SiO_2$, and preferably with comparable thermal expansion coefficients (~30%).

The undercoating 402 has a preferred thickness of about 1.5 microns or less, with an ideal range of between 1.5 microns and 0.5 microns, as measured in a direction perpendicular to the plane of the surface 424 of the substrate 404 engaging the undercoating 402. The reduced thickness makes the undercoating 402 more thermally conductive, as steady state heat transfer is a function of distance the heat has to travel. The undercoating 402 can be reduced to the desired thickness during fabrication using chemical mechanical polishing (CMP). Unlike current mechanical lapping processes which removes materials and planarizes the wafer surface by exerting mechanical force, CMP combines surface chemical reaction and mechanic polishing to remove materials and planarize the surface. Thus, CMP is gentler to the wafer surface (leading to less surface defects) and follows well with wafer surface topography (leading to better thickness control), and thus produces a smooth undercoating of a uniform thickness within the range presented above.

Figure 5:
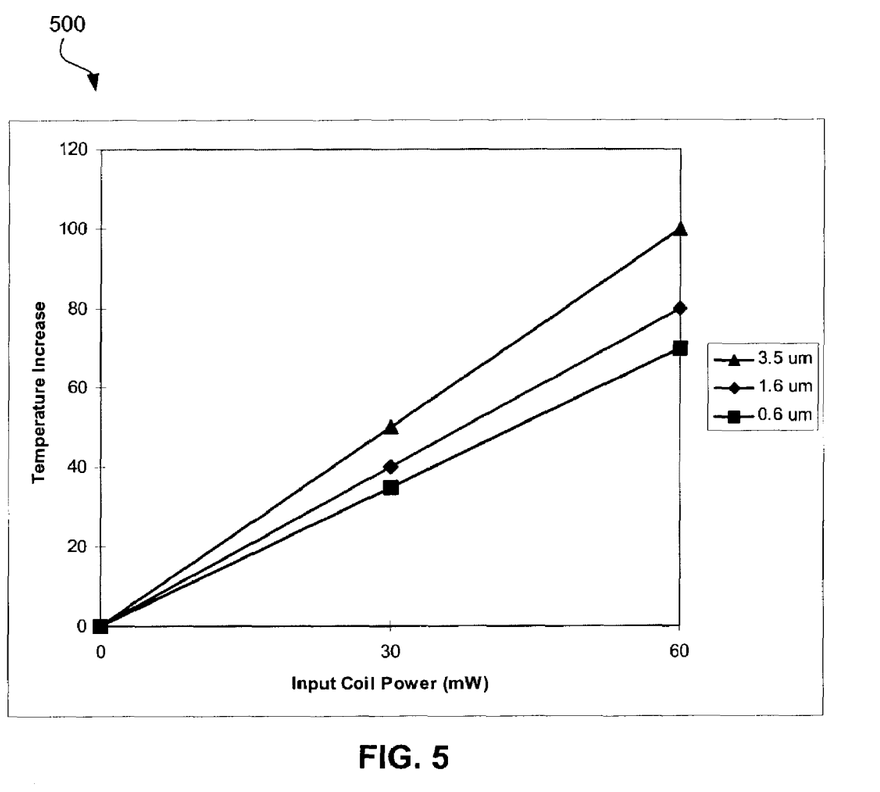
FIG. 5 is a graph illustrating the effect of undercoating thickness on temperature in an illustrative case.

FIG. 5 is a graph 500 illustrating the effect of undercoating thickness on temperature in an illustrative case. Here, alumina undercoatings with thicknesses of 0.6, 1.6 and 3.5 microns were placed on identical wafers and currents of varying wattage were passed through the coil. As shown, using the industry standard 3.5 microns thick undercoating as the baseline, the coil temperature is reduced 20% if the undercoating thickness is reduced to 1.6 microns, and 30% if the undercoating thickness is reduced to 0.6 microns.

In the preferred thermally optimized configuration, the undercoating 402 is constructed of a material having a thermal conductivity greater than that of amorphous $Al_2O_3$.

Suitable materials from which to construct the undercoating 402 include, but are not limited to, crystalline $Al_2O_3$, AlN, AlNO etc. The thermally conductive material(s) used to construct the undercoating 402 can be prepared on the substrate 404 by a process such as sputtering, ion beam deposition, and/or chemical vapor deposition.

The thickness of these thermally conductive materials can be of an industry standard thickness, or in the preferred thinner range of less than about 1.5 microns to provide an even more thermally efficient design. Again, CMP can be used to achieve a smooth and uniformly thin undercoating 402.

Figure 6:
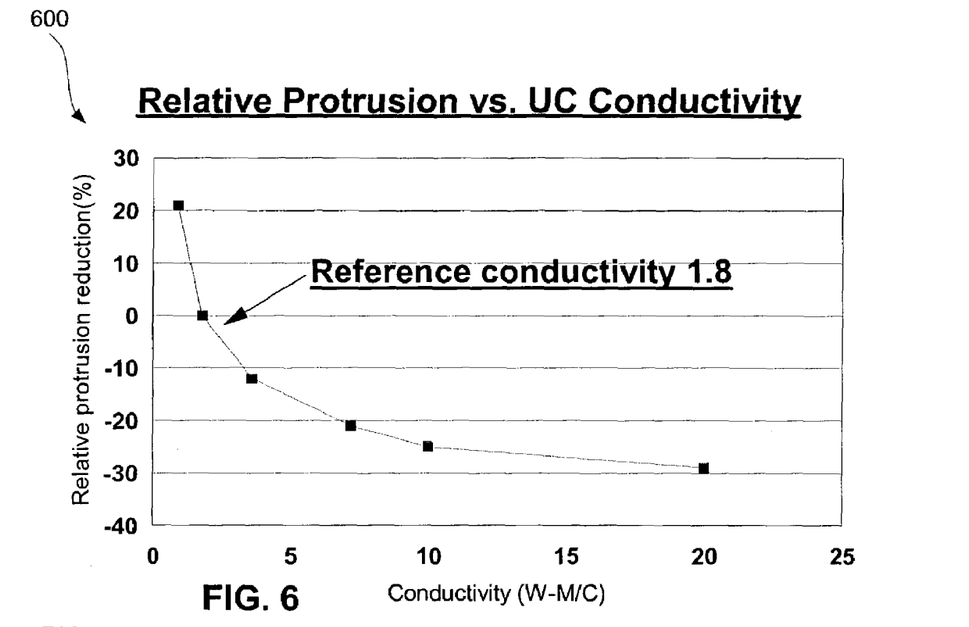
FIG. 6 is a chart depicting relative protrusion of the poles vs. thermal conductivity of the undercoating.

FIG. 6 is a chart 600 depicting a curve of relative protrusion of the poles 408, 422 vs. thermal conductivity of the undercoating 402. In this example, the reference thermal conductivity is 1.8 cgs units. As shown, increasing the thermal conductivity by 5 cgs units from the reference value reduces the relative protrusion by 20%. Increasing the thermal conductivity of the undercoating 402 even more can result in a reduction of thermal protrusion by 30% or more.

Another advantage of a more thermally conductive undercoating 402 is that the read sensor is cooler so that either 1) the read current can be increased for heightened sensitivity, 2) the read sensor has an improved life due to reduced thermal degradation effects, or 3) a combination of the two.

Figure 7:
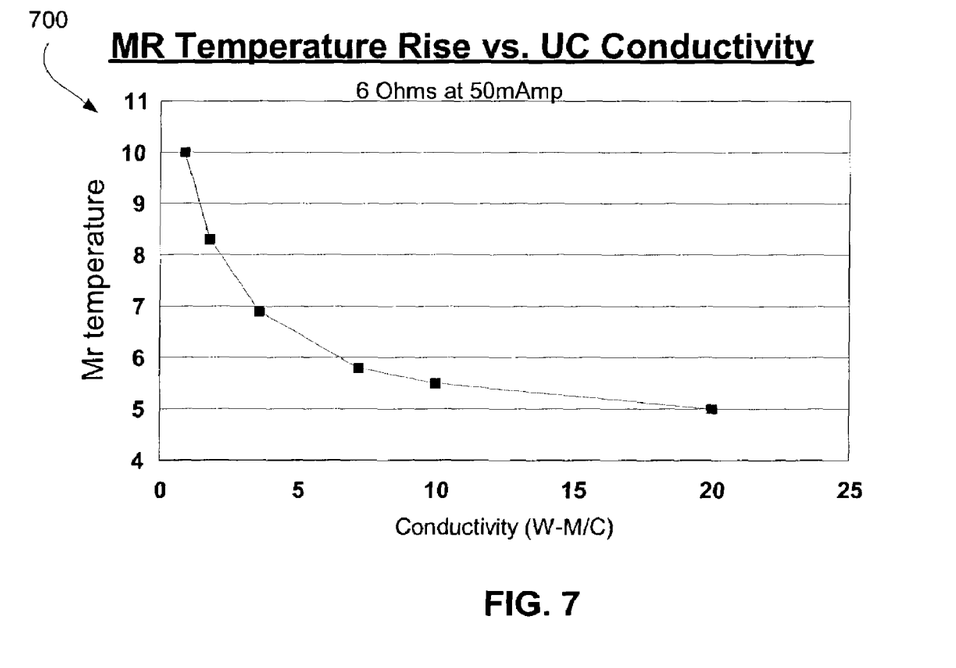
FIG. 7 is a graph showing MR temperature rise vs. thermal conductivity of the undercoating.

FIG. 7 is a graph 700 showing a curve of the MR temperature rise vs. thermal conductivity of the undercoating 402. As shown in this example, the MR temperature is significantly reduced upon increasing the thermal conductivity of the undercoating 402.

Preferably, the substrate 404 and the undercoating 402 are constructed of materials having comparable thermal expansion coefficients (i.e., are within specified parameters or within a certain number of units of each other). For example, the thermal expansion coefficient can be about 30%. Comparable thermal expansion coefficients are preferred because, a hard disk drive according to one embodiment may be operated in a wide temperature range, such as from –25 C. to +80 C. If the thermal expansion coefficients are not similar or the same, dissimilar materials will protrude toward the ABS in a different manner than the substrate, resulting in either unacceptable recession or protrusion.

Ideally, the undercoating 402 is constructed of materials having thermal expansion coefficients no larger than the substrate 404. Therefore at an elevated temperature, the undercoat 402 would not protrude out of the slider. The undercoat with smaller thermal expansion coefficient may also moderately reduce the protrusion of the first and second shield layers.

Referring to FIG. 4, a pad 426 is operatively coupled to a layer positioned between the pad 426 and the undercoating 402 rather than directly on the undercoating 402. In the past, the pad 426 was placed directly on top of the undercoat and connected to the MR layer 410 of the read element. However, the pad 426 picks up noise from the substrate 404 due to its close proximity. This problem is compounded by the fact that the path from the detector 410 is very thin, and can also pick up from the substrate 404.

As shown in FIG. 4, the pad(s) 426 can be positioned substantially higher than the lower shield layer. For example, electric contact pads of the read and write elements are preferably separated from the undercoating by insulation planarization layers 428. Layer by layer planarization is preferably used, so the pad 426 can be added later, at a position away from the undercoating 402. Accordingly, one or more planarization layers 428 of $Al_2O_3$ are deposited on top of and beside the lower shield layer 406 and planarized back to the lower shield layer 406. Additional layers can be added. The pad 426 is added above the additional layers. The planarization layer(s) 428 preferably have thicknesses ranging from 2–10 microns, which effectively separates the contact pads from the UC and thus prevents the read element from coupling to the conducting substrate. Being positioned several layers above the substrate 404, the noise the pad 426 picks up from the substrate 404 is negligible.

In use, the recording head structure and improvements set forth herein can be used in magnetic recording heads for any type of magnetic media, including but not limited to disk media, magnetic tape, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic head, comprising:
   a substrate;
   an undercoating coupled to the substrate, wherein the undercoating has a thickness in a range of between about 0.5 microns and about 1.5 microns in a direction perpendicular to a plane of a surface of the undercoating engaging the substrate, wherein the undercoating is formed of a different material than the substrate, wherein the substrate and the undercoating are constructed of materials having comparable thermal expansion coefficients within 30% of each other, wherein the undercoating is constructed of a material having a thermal conductivity greater than that of amorphous $Al_2O_3$;
   a read element coupled to the undercoating; and
   a write element coupled to the undercoating, the write element having an electrically conductive coil,
   wherein the undercoating has a thickness in the range of about 0.5 microns to about 0.6 microns.

2. The magnetic head as recited in claim 1, further comprising a lower shield layer coupled to the undercoating, and a pad positioned above and coupled to a layer positioned between the pad and the undercoating, the layer being positioned beside the lower shield layer on a side thereof opposite an air bearing surface of the magnetic head.

3. The magnetic head as recited in claim 2, wherein the pad is coupled to the read element, wherein the pad is positioned several layers above a plane extending along a surface of the lower shield layer facing the read element.

4. The magnetic head as recited in claim 1, and further comprising a contact pad for the read element coupled to a planarization layer of the write element and positioned several layers above the undercoating.

5. The magnetic head as recited in claim 1, wherein the undercoating is reduced to a desired thickness during fabrication using chemical mechanical polishing.

6. A magnetic head, comprising:
   a substrate;
   an undercoating coupled to the substrate, wherein the undercoating is constructed of a material having a thermal conductivity greater than that of amorphous $Al_2O_3$, wherein the undercoating has a thermal expansion coefficient no greater than a thermal expansion coefficient of the substrate, wherein the undercoating is formed of a different material than the substrate;
   a read element coupled to the undercoating;
   a write element coupled to the undercoating, the write element having an electrically conductive coil;
   a lower shield layer coupled to the undercoating; and
   a pad positioned above, and coupled to, a planarization laser positioned between the pad and the undercoating, the planarization layer being positioned beside the lower shield layer on a side thereof opposite an air bearing surface of the magnetic head, wherein the pad is electrically coupled to the read element and is positioned several layers above the undercoating.

7. The magnetic head as recited in claim 6, wherein the substrate is $Al_2O_3$-TiC.

8. The magnetic head as recited in claim 6, wherein the substrate is silicon based.

9. The magnetic head as recited in claim 6, wherein the undercoating has a thickness of less than 1.5 microns in a direction perpendicular to a plane of a surface of the undercoating engaging the substrate.

10. The magnetic head as recited in claim 9, wherein the undercoating is reduced to a desired thickness during fabrication using chemical mechanical polishing.

11. The magnetic head as recited in claim 6, wherein the material of the undercoating is selected from a group consisting of crystalline $Al_2O_3$, AlN, AlNO, SiN, and SiC.

12. The magnetic head as recited in claim 6, wherein the substrate and the undercoating are constructed of materials having comparable thermal expansion coefficients within 30% of each other.

13. The magnetic head as recited in claim 6, wherein the undercoating has a thickness in the range of about 0.5 microns to about 0.6 microns in a direction perpendicular to a plane of a surface of the undercoating engaging the substrate.

14. A magnetic head, comprising:
   a substrate;
   an undercoating coupled to the substrate, wherein the undercoating is constructed of a material having a thermal conductivity greater than that of amorphous $Al_2O_3$, wherein the undercoating has a thermal expansion coefficient no greater than a thermal expansion coefficient of the substrate, wherein the undercoating is formed of a different material than the substrate;
   a read element coupled to the undercoating;
   a write element coupled to the undercoating, the write element having an electrically conductive coil;
   a lower shield layer coupled to the undercoating; and
   a pad positioned above, and coupled to, a planarization layer positioned between the pad and the undercoating, the planarization layer being positioned beside the lower shield layer on a side thereof opposite an air bearing surface of the magnetic head,
   wherein the undercoating has a thickness in the range of about 0.5 microns to about 0.6 microns in a direction perpendicular to a plane of a surface of the undercoating engaging the substrate.

* * * * *

UNITED STATES PATENT AND TRADEMARK OFFICE
CERTIFICATE OF CORRECTION

PATENT NO. : 7,035,047 B2  Page 1 of 1
APPLICATION NO. : 10/271293
DATED : April 25, 2006
INVENTOR(S) : Hsiao et al.

It is certified that error appears in the above-identified patent and that said Letters Patent is hereby corrected as shown below:

col. 8, line 13 change "laser" to --layer--;
col. 8, line 32 change "AIN, AINO" to --AlN, AlNO--.

Signed and Sealed this

Twenty-second Day of August, 2006

JON W. DUDAS
*Director of the United States Patent and Trademark Office*